United States Patent [19]

Van Scoy

[11] 4,413,532
[45] Nov. 8, 1983

[54] ORIFICE METER WITH ISOLATION VALVE ON THE CARRIER

[75] Inventor: Davis A. Van Scoy, Simonton, Tex.

[73] Assignee: Grove Valve and Regulator Company, Oakland, Calif.

[21] Appl. No.: 362,885

[22] Filed: Mar. 29, 1982

[51] Int. Cl.³ .............................................. G01F 1/42
[52] U.S. Cl. .................................... 73/861.61; 138/44
[58] Field of Search ............ 73/272 R, 861.61, 861.62; 138/44, 94.3

[56] References Cited

U.S. PATENT DOCUMENTS

| | | | |
|---|---|---|---|
| 1,903,068 | 3/1933 | Robinson | 138/44 |
| 1,957,807 | 5/1934 | Robinson | 138/44 |
| 4,370,893 | 2/1983 | Combes | 73/861.61 |

Primary Examiner—Herbert Goldstein
Attorney, Agent, or Firm—Melvin R. Stidham

[57] ABSTRACT

An orifice meter with a gate-like orifice disc carrier along the lower edge of which is a valve closure member. There is a restricted passageway across the top of the valve body and a seal ring carried around the valve closure member seals off the valve body when the carrier is moved upward from its normal working position across the flow passage. With the valve body sealed off, a hollow, hinged lid into which the carrier is moved, may be raised for servicing or replacing an orifice on the carrier.

3 Claims, 1 Drawing Figure

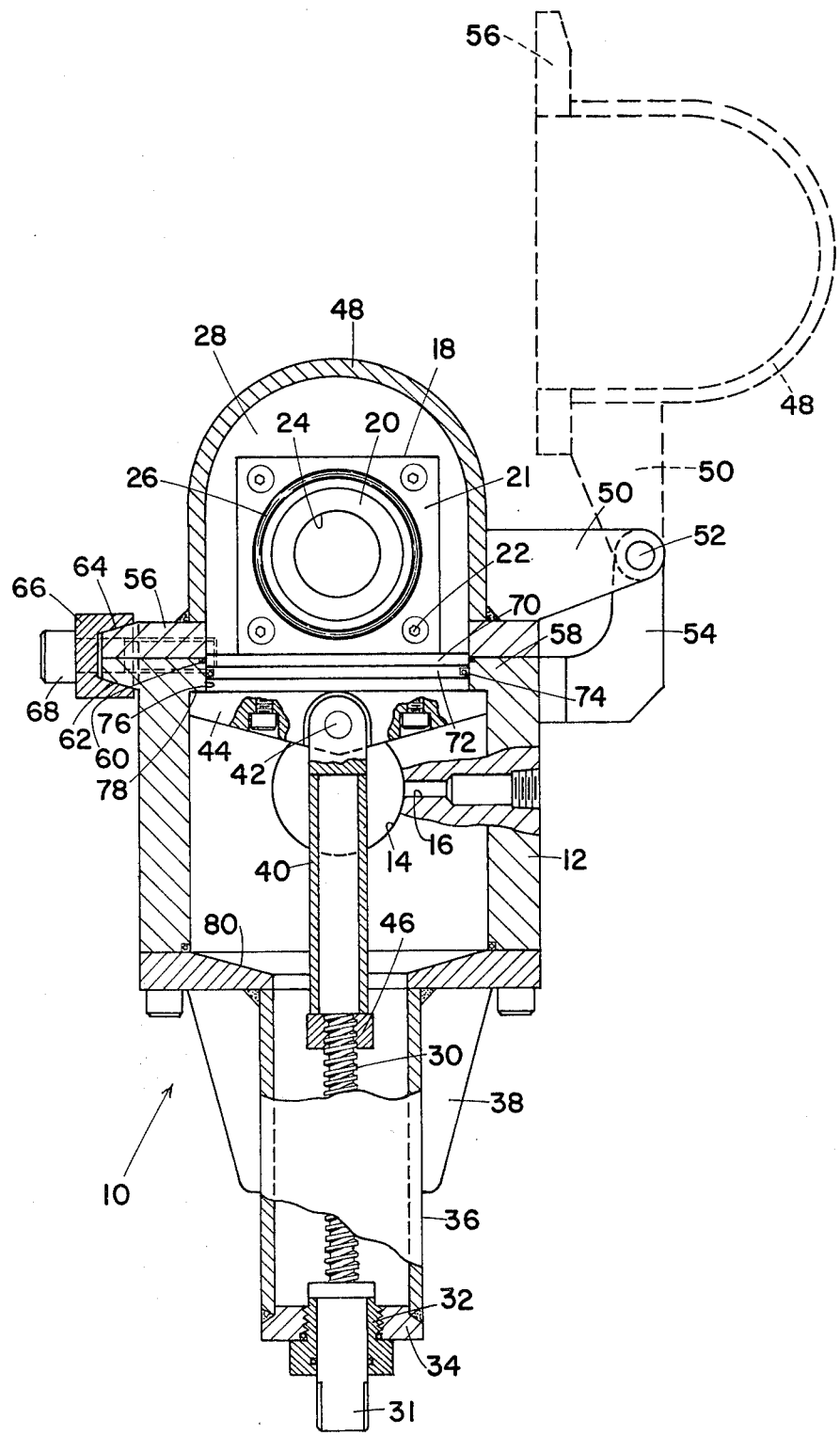

ORIFICE METER WITH ISOLATION VALVE ON THE CARRIER

BACKGROUND OF THE INVENTION

Natural gas is generally sold by volumetric measurement, and one way to measure the volume of a flowing gas is to pass it through an orifice of a known size to measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, line scale, and other foreign particles in the flowing stream, it must be replaced at frequent intervals to insure accuracy in measurement.

In both the basic and the junior type orifice meters, the pipeline must be shut down or bypassed while the worn orifice disc is removed from the body and replaced with a new disc. In the more sophisticated or senior type orifice fittings, the orifice disc carrier is moved out of the flow passage to a displaced portion or compartment of the housing, which is then isolated from the flow passage so that flow can be resumed while the orifice disc is being replaced. If gas flow is continued during the time the orifice disc is being replaced, it is customary to assume a continuing, constant flow rate based on previous measurements. However, with changes in pressure and other variations that can take place in pipeline flow, it highly desirable to minimize the length of the period during which the parties rely on an unmeasured, assumed rate of flow.

OBJECT OF THE INVENTION

It is an object of this invention to provide an orifice meter wherein an orifice disc may be removed and replaced in a minimum amount of time.

It is a further object of this invention to provide an orifice meter wherein the orifice carrier may be moved to carry the orifice disc to an isolation compartment displaced from the flow passage and, at the same time, seal off that displaced compartment from the gas flow in the pipeline.

Other objects and advantages of this invention will become apparent from the description to follow, particularly when read in conjunction with the accompanying drawings.

SUMMARY OF THE INVENTION

In carrying out this invention, there is provided a valve body with a gate-like orifice disc carrier mounted for sliding movement therein to be raised from an active position in line with the flow passages, to a servicing position located in an upper compartment of the valve body. A valve seating surface is provided around a transition passageway between the operating housing and the isolation chamber and a globe type valve member is carried on the bottom of the orifice disc carrier to move into, and plug off the transition passageway by sealing around the seating surface. This closes off the isolation chamber to enable removal and replacement of the orifice disc while gas flows through the main housing below.

BRIEF DESCRIPTION OF THE DRAWING

The drawing is a vertical section view of an orifice meter embodying features of this invention.

DESCRIPTION OF A PREFERRED EMBODIMENT

Referring now to the drawing with greater particularity, the orifice meter 10 of this invention includes a housing 12 with aligned flow passages 14. Pressure taps 16 extend into the passageways 14, so that when an orifice disc is in place across the flow passage, pressures on opposite sides of the orifice disc can be metered so that a pressure drop, representative of fluid flow, can be determined.

Slideably carried in the housing 12 is an orifice plate carrier 18 to which an orifice disc 20 is secured by means of a retainer plate 21 secured to the carrier by cap screws 22. The orifice disc 20 includes a measured orifice opening 24 of a predetermined size. A resilient seal ring 26 on the orifice retainer plate 20 seals around the flow passages 14 when aligned therewith, in order to prevent a leak path around the orifice opening 24.

The orifice disc carrier 20 is movable from the normal active housing 12, up into a servicing compartment 28 by means of a threaded screw 30 having an exposed square end 31 for gripping by a suitable wrench (not shown). The screw member 30 is rotatable in a bearing member 32 carried on the lower end 34 of an actuator housing 36. The actuator housing 36 may be reinforced by strengthening ribs 38.

A hollow valve stem 40, which is pivoted at 42 to a depending block 44 bolted at 45 to the carrier 18, carries an integral nut 46 at the lower end thereof to threadedly engage the rotatable screw 30. Hence, rotation of the screw 30 as by applying a wrench to the lower, squared end thereof 31 will cause the hollow stem 40 to ride up and down the screw to raise and lower the carrier 18.

With the carrier 18 raised to the position shown in solid lines, within the service chamber 28, a cover member 48, having an integral lug 50, which is pivoted at 52 to a complementary lug 54 on the housing 12, may be raised to the position shown in phantom in the drawing wherein the orifice carrier 18 and the orifice disc itself 20, are fully exposed for servicing and/or replacement. The orifice disc may be replaced simply by removing the four cap screws 22 and retainer plate 21 and then replacing same when a new orifice disc is in place.

A sealing flange 56 which is welded around the cover member 48 engages firmly against a complementary flange 58 around the top of the housing 12 and suitable seal means 60 provide a fluid-tight seal when the cover member is closed. Complementary chamfered surfaces 62 and 64 on the flanges 58 and 56 are engaged by wedging surfaces on a clamping member 66, so that by tightening of a cap screw 68 the flanges 56 and 58 are tightly sealed.

Carried around the bottom of the orifice carrier 20 is a valve plug 70, which is a generally oblong configuration, flat along both sides and semicylindrical at the ends. The plug 20 is provided with a peripheral groove 72 that contains a resilient seal ring, such as an O-ring 74. The opening 76 at the top of housing 12 is of the size and shape to accommodate the valve plug member 70 snugly, so that when the orifice carrier is in its upper position, as determined by engagement of the depending block 44 with shoulders 78 on the valve housing 12, the plug 70 will be contained within the opening 76 and the seal 74 isolates the chamber 28 from the flow passages so that flow of gas through the passages 14 can be resumed, after the orifice carrier is so elevated, even with the cover member 48 opened, as shown in phantom.

When the repairs or servicing of the orifice disc are completed, the cover is closed to the position shown in solid lines and cap screw 68 tightened to form a fluid-tight seal between the flanges 56 and 58. Then, the screw 30 is rotated to lower the carrier 18 to its lowermost position, as determined by engagement of the depending block 44 with complementary surfaces 80 at the bottom of the valve housing, in which position the orifice opening 24 is in coaxial alignment with the flow passages 14.

While this invention has been described in conjunction with a preferred embodiment thereof, it is obvious that modifications and changes therein may be made by those skilled in the art to which it pertains, without departing from the spirit and the scope of this invention, as defined by the claims appended hereto.

What is defined as invention is:

1. An orifice meter comprising:
   a housing with a lower working chamber and a service chamber;
   said lower chamber including:
   a pair of planar, parallel walls with aligned flow passages therethrough;
   a gate-like carrier for an orifice disc movable between said chambers;
   seal rings on opposite sides of said carrier operative to seal around said flow passages when said carrier is in said working chamber;
   a restricted passageway between said chambers;
   a valve closure member of a size and shape to fit snugly in said passageway carried on the lower end of said carrier; and
   a resilient seal around said closure member.

2. The orifice meter defined by claim 1 including:
   a hollow enclosure forming said upper chamber hingedly connected to said housing; and
   releasable means securing said enclosure on said housing;
   said resilient seal engaging around the inner surface of the passageway on said lower chamber.

3. The orifice meter defined by claim 1 including:
   inner surfaces on said lower chamber forming said restricted passageway;
   said inner surfaces and said valve closure member being parallel and planar along opposing sides and semi-cylindrical at the ends.

* * * * *